(No Model.)
H. A. GRAY.
PROCESS OF REMOVING THE SHELLS FROM COCOANUTS.
No. 306,148. Patented Oct. 7, 1884.
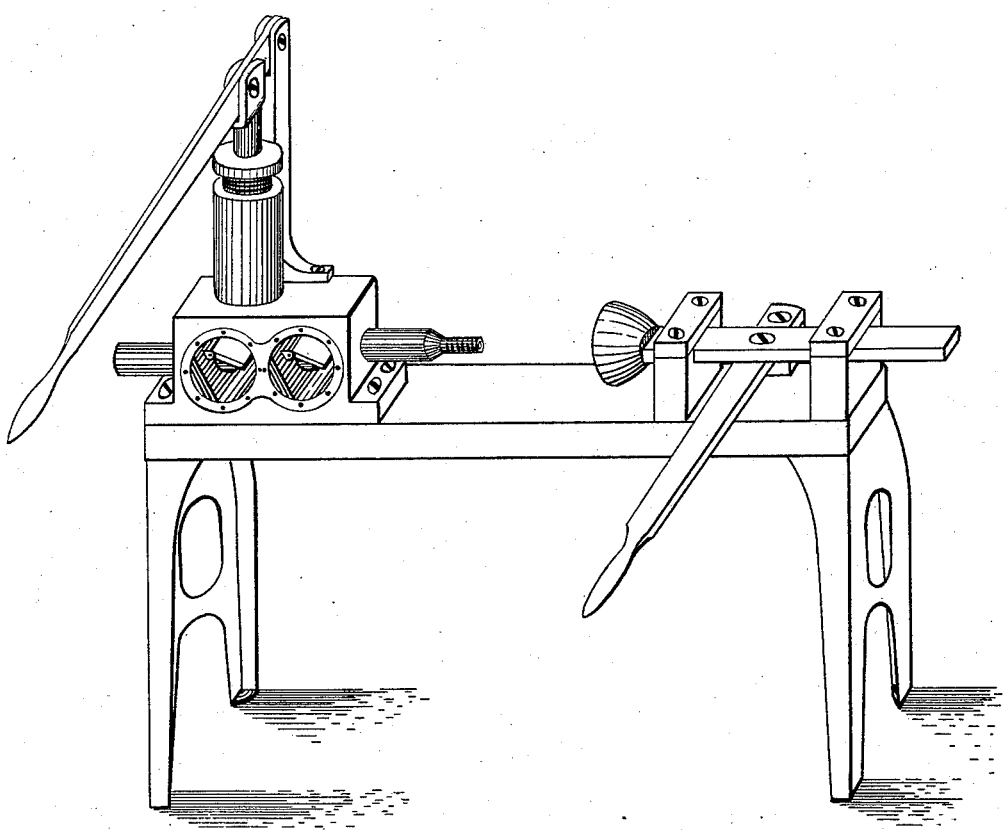
Witnesses,
George L. Barnes
Daniel S. Kenney Jr.
Inventor,
Hiram A. Gray
by Geo. Terry
Atty

UNITED STATES PATENT OFFICE.

HIRAM A. GRAY, OF NEW HAVEN, CONNECTICUT.

PROCESS OF REMOVING THE SHELLS FROM COCOANUTS.

SPECIFICATION forming part of Letters Patent No. 306,148, dated October 7, 1884.

Application filed February 4, 1884. (No model.)

*To all whom it may concern:*

Be it known that I, HIRAM A. GRAY, a citizen of the United States of America, residing at New Haven, in the county of New Haven and State of Connecticut, have invented certain new and useful Improvements in Processes of Removing Shells from the Meat of Cocoanuts, of which the following is a specification, reference being had therein to the accompanying drawing.

Heretofore the shells of cocoanuts have been removed from the meat of the fruit by chopping with a hatchet as the cocoanuts were held on a block of wood. In this way chips are often cut from the meat and the meat wasted. Frequently also the meat is broken, and as a consequence the separation of the dark skin or paring of the meat is rendered a tedious process, as a machine cannot be used to pare the pieces.

The object of my invention is to obtain the meat of the fruit entire, and, of course, in good condition for paring by a machine, and at the same time to provide a more expeditious and economical way of removing the shells.

To these ends my invention consists, essentially, in making a hole through the shell and in forcing a fluid into the shell until the pressure of the fluid bursts the shell, as the process and the means by which it is conducted are hereinafter more fully described.

To carry my invention into effect I employ an ordinary force-pump, or a pump with only slight adaptations for the purpose, and some means for holding the fruit.

The drawing hereto annexed shows a force-pump with the covers removed to show the valves. The end of the nozzle is threaded and the pipe leading into the pump runs to a water-supply. For convenience it is mounted on a frame, and the pump needs no further description. On the other end of the frame are two upright parts in which a slide is arranged, having a cup on its end. To the slide a lever is attached to move it and to press the cocoanut, one end of which is placed in the cup against the nozzle of the pump. A hole being made through the shell (but not through the meat) to fit the threaded nozzle of the pump, the cocoanut is screwed onto it; or, if the nozzle is tapering and not threaded, it is inserted into the hole in the nut, and the means shown are used to hold the nut on the nozzle. A single downward stroke of the pump-handle bursts the shell and leaves the meat entire. If the pressure is applied gradually, and if the cocoanut is wet, small bubbles of water appear all over the shell. These bubbles show that a thin stratum of water has been forced between the shell and the meat of the fruit. This thin stratum of water completely separates the shell from the meat, and this separation is complete, though the downward movement of the handle is rapid instead of gradual. No water is forced through the meat into the cavity of the same by the operation.

In a lot of cocoanuts we occasionally find nuts that have flat places, or places nearly flat, on the shells. In these nuts corresponding flat places are found on the meat. When these nuts are subjected to my process, a hole is forced through the flat place on the meat into the cavity of the meat. To remedy this trouble and keep the meat entire, a hole is made through the shell and the meat. The nuts are then submerged in water until the air in the cavity in the meat escapes and the cavity is filled with water. The hole may be plugged up, and if left open the operation is so quick that the open hole will not let out water enough to allow the meat to be broken. When it is desired to have the shell break on a particular line, a small groove may be cut in the shell, and the fracture will usually follow the groove.

Other means may be employed to force water into the shells, and the water-pressure in the pipes of the water-works of some of our cities is sufficient for the purpose and may readily be adapted to it.

Air and other fluids besides water may be used to burst the shells, but the elastic property of air causes the pieces of shell to fly and makes it objectionable.

Having fully described my invention, what I desire to claim and secure by Letters Patent is—

The process herein described of removing a cocoanut-shell from the meat of the fruit, consisting, essentially, in making a hole through the shell and in forcing a fluid into the shell by suitable means until the pressure of the fluid bursts the shell, as described.

In testimony whereof I affix my signature in presence of two witnesses.

HIRAM A. GRAY.

Witnesses:
GEORGE TERRY,
GEORGE L. BARNES.